United States Patent
Schweid

(10) Patent No.: US 11,954,821 B1
(45) Date of Patent: Apr. 9, 2024

(54) ALTERING PIXELS TO SCALE IMAGES

(71) Applicant: Xerox Corporation, Norwalk, CT (US)

(72) Inventor: Stuart Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/050,102

(22) Filed: Oct. 27, 2022

(51) Int. Cl.
    *G06T 3/40*     (2006.01)
    *G06T 3/4023*     (2024.01)

(52) U.S. Cl.
    CPC .................................. *G06T 3/4023* (2013.01)

(58) Field of Classification Search
    None
    See application file for complete search history.

(56) References Cited

U.S. PATENT DOCUMENTS

| | | | |
|---|---|---|---|
| 6,844,940 B2 | 1/2005 | Warmus et al. | |
| 7,738,735 B2 | 6/2010 | Kotani | |
| 8,265,424 B1 | 9/2012 | Avidan et al. | |
| 8,983,940 B2 | 3/2015 | Lin et al. | |
| 9,088,673 B2 | 7/2015 | Banner et al. | |
| 9,542,079 B2 | 1/2017 | Ignatchenko et al. | |
| 9,710,691 B1* | 7/2017 | Hatcher | G06V 40/1353 |
| 9,838,682 B2 | 12/2017 | Tanaka et al. | |
| 2001/0040585 A1* | 11/2001 | Hartford | G09G 5/00 345/667 |
| 2014/0015882 A1* | 1/2014 | Shin | B41J 2/0459 347/10 |

\* cited by examiner

*Primary Examiner* — Joni Hsu
(74) *Attorney, Agent, or Firm* — Gibb IP Law Firm, LLC

(57) ABSTRACT

An image has pixels arranged in perpendicular rows/columns. The size of the image is changed to produce a changed-size image and the changed-size image is output. The process of changing the size of the image adds at least one row/column as at least one inserted row/column. The inserted row/column is made up of data from generating adjacent rows/columns of the perpendicular rows/columns. Embodiments that reduce the size of the image remove the generating adjacent rows/columns that were used to form the inserted row/column and, in such reduction processing the inserted row/column is added where the (now removed) generating adjacent rows/columns were previously positioned. In embodiments that increase the size of the image, instead of removing the generating adjacent rows/columns, the inserted row/column is merely inserted between the adjacent rows/columns.

14 Claims, 8 Drawing Sheets

ALTERING PIXELS TO SCALE IMAGES

BACKGROUND

Systems and methods herein generally relate to image scaling and more particularly to scaling images by altering pixels within images.

The size of images often needs to be adjusted to accommodate image registration, different printing formats, different printing sizes, memory limitations, etc. Changing the size of an image can be referred to as "scaling" the image because such processing does not change the image by removing portions (cropping) but instead changes the image by making the entire image bigger or smaller.

In one example, a sheet of print media on which an image will be printed is aligned with the printing components that will print the image. This process is called "registering" the image on the sheet. It can involve slight scaling (size changes) of the image to account for differences between the image dimensions and the sheet dimensions, etc. Sometimes, when images are scaled, very fine or very small features may be removed or distorted. This can be disadvantageous to the image quality and can result in user dissatisfaction.

SUMMARY

Methods herein receive an image that has pixels arranged in perpendicular rows/columns. These methods change the size of the image to produce a changed-size image and output the changed-size image. The process of changing the size of the image includes removing, modifying, and/or inserting rows and/or columns. A new single row/column is generated by alternating the data values of adjacent rows/columns. In embodiments that reduce the size of the image, these methods replace the generating adjacent row/column pair combination with the generated single row/column (thus reducing the row/column numbers). In embodiments that increase the size of the image, the generated single row/column is inserted between the generating adjacent row/columns pairs. Therefore at least one inserted row/column is formed from the alternating data from the adjacent rows/columns (e.g., alternating pixels from the adjacent rows/columns).

Other methods herein similarly receive an image that has pixels arranged in scanlines. These methods also change the size of the image to produce a changed-size image and output the changed-size image. The process of changing the size of the image inserts or replaces adjacent pixels with generated pixel data. The generated pixels are made up of data from adjacent pixels, and similarly the generated scanline is made up of data from adjacent scanlines.

When these methods reduce the size of the image, the adjacent pixels and adjacent scanlines are removed, the generated pixels are placed where the adjacent pixels were positioned, and the generated scanline is placed where the adjacent scanlines were positioned. When these methods increase the size of the image, no pixels or scanlines are removed but the generated pixels are inserted between the adjacent pixels and the generated scanline is inserted between the adjacent scanlines.

In these methods, the generated pixels are formed from alternating data from the adjacent scanlines and the generated scanline is formed from alternating data from the adjacent scanlines. Thus, the generated pixels are made of alternating pixels from the adjacent scanlines and the generated scanline is made of alternating pixels from the adjacent scanlines.

System embodiments herein include (among other components) a processor adapted to receive an image. The image has pixels arranged in perpendicular rows/columns. Such systems also include an input/output device adapted to receive instructions to change the size of the image. The processor is adapted to change the size of the image to produce a changed-size image. The input/output is adapted to output the changed-size image. The processor is adapted to change the size of the image by generating at least one row/column as at least one generated row/column. This generated row/column is formed from data from adjacent rows/columns of the perpendicular rows/columns.

When the instructions to change the size of the image are instruction to reduce the size of the image, the processor is adapted to remove the adjacent rows/columns and the generated row/column is inserted where the adjacent rows/columns were positioned. When the instructions to change the size of the image are instruction to increase the size of the image, the generated row/column is inserted between the adjacent rows/columns. The generated row/column is made up of alternating data (e.g., pixels) from the adjacent rows/columns.

These and other features are described in, or are apparent from, the following detailed description.

BRIEF DESCRIPTION OF THE DRAWINGS

Various exemplary systems and methods are described in detail below, with reference to the attached drawings, in which.

DETAILED DESCRIPTION

As noted above, when images are scaled (increased or reduced in size) very fine or very small features may be undesirably removed or added. For example, image on paper registration can be achieved by performing a combination of scaling and translation on the input image, where the scaling can be near unity (scale factor is approximately 1.0). A process known as "nearest neighbor interpolation" can be used to perform the scaling. In this processing, edge sharpness of text is preserved and, at near unity scaling, nearest neighbor interpolation does not often cause artifacts in images (when performed at 1200 dpi or above, for example).

However, especially for very fine text objects, some image objects can either be significantly shrunk (or even removed) or significantly grown (e.g., doubled in size) by the scaling. In view of these issues, methods and systems herein modify the nearest neighbor interpolation processing to attenuate issues with fine text and line art features. The methods and systems herein apply a slightly different translation to the rows and columns of an image to ensure that an entire row's or column's pixel data is not eliminated from or added to the image, and this avoids issues with fine text and line art features in images. With very slight computational costs, the systems and methods herein visibly improve line art and small text when scaling images.

In greater detail, with conventional nearest neighbor scaling reduction, every so often a pixel value is removed, resulting in a column being completely removed. Similarly, every so often a scanline is removed, resulting in a row being completely removed. This is what allows the length of an input row to be reduced (and height of a column to be reduced if scanlines are removed). The locations where this removal occurs is a function of the scale factor and rounding technique back to an integer location, with a cadence that is dependent only on the scale factor. For example, in conventional nearest neighbor image reduction by 1%, for every 100 input pixels in a scanline there are only 99 output pixels, where the same pixel position in the scanline is not used (skipped over). For nearest neighbor scaling, the pixel locations skipped over will be the same in every scanline. This is equivalent to removing an entire column (or row if rows are perpendicular to the scanlines) of the input image.

Discussing this in an example that removes a column, a given scanline of an image may have pixel values: a,b,c,d, e,f. The conventional nearest neighbor scaling may remove pixel "d", for instance, resulting in an output of: a,b,c,e,f. If pixel d was part of a single wide pixel line, it will be removed on every subsequent scanline at the same location and a vertical line will disappear from the output image because column d is effectively removed from the image.

Figure 1:
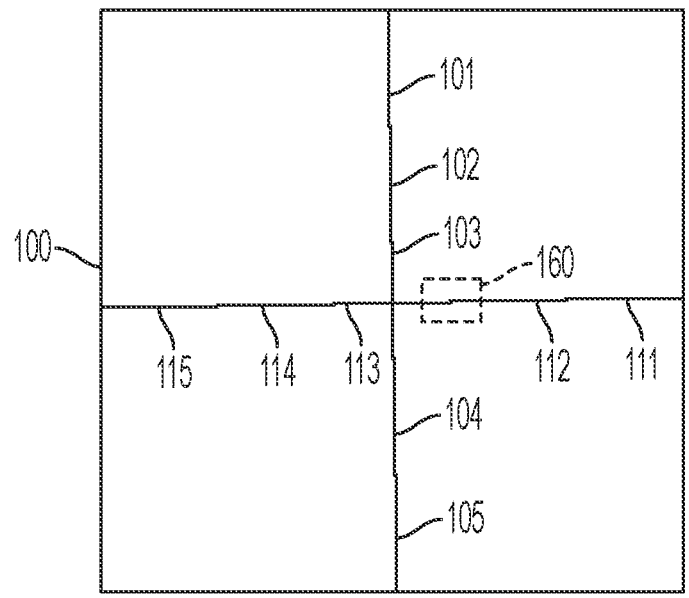
FIG. 1 is a schematic diagram illustrating an image processed by methods and devices herein.
Figure 6A:
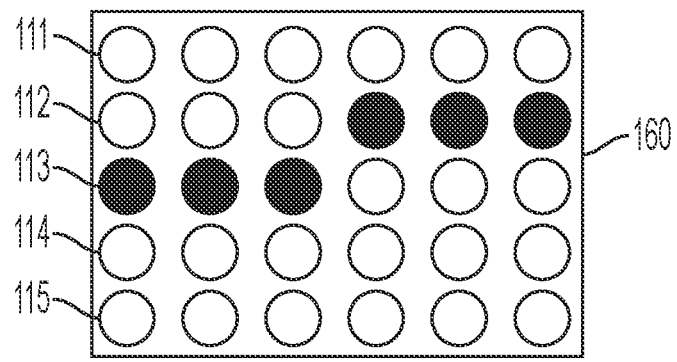
FIGS. 6A-6C are schematic diagrams illustrating processing performed, at a pixel level, on a portion of the image shown in FIG. 1.
Figure 6B:
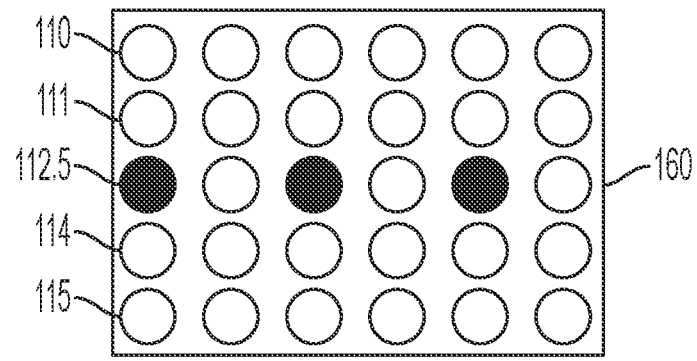
Figure 6C:
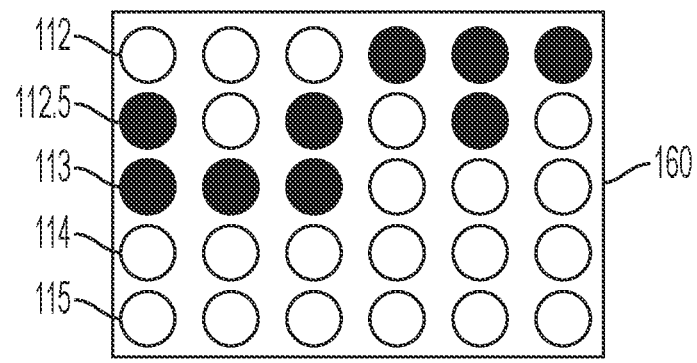

FIG. 1 illustrates an image 100 of two shallow angled lines (one vertical 101-105, one horizontal 111-115). FIG. 1 is a high magnification of a small area of a larger image and the vertical 101-105 and horizontal 111-115 lines appear in steps corresponding to locations where the shallow angled lines are printed/displayed using immediately adjacent pixels. An even greater magnification of area 160 is shown in FIGS. 6A-6C, discussed in detail below.

In this example, the line numbers 101-105 can correspond to pixel locations 101-105 and the line numbers 111-115 can correspond to scanline numbers. As is understood by those ordinarily skilled in the art, the pixel locations and scanlines are aligned perfectly (exactly) vertically and horizontally which results in the two shallow angled lines being printed/displayed by a specific pixel location or scanline only briefly before the two shallow angled lines are next printed/displayed by a the very next pixel location or scanline. As used herein the phrases immediately next, immediately adjacent, directly adjacent, or similar phrases, indicate that there are no intervening pixel locations or scanlines between two adjacent pixel locations or scanlines.

Figure 2:
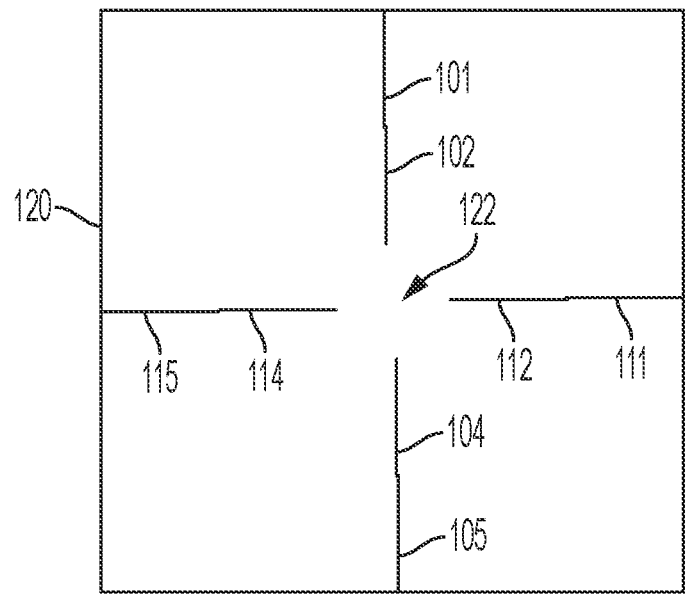
FIG. 2 is a schematic diagram illustrating processing performed on the image shown in FIG. 1.

FIG. 2 shows the same image portion (now numbered 120) after application of a near unity scaling (0.99) image reduction using conventional nearest neighbor scaling, which results in the periodic removal of pixel locations and scanlines. In this example, conventional nearest neighbor scaling removes (skips) pixel location 103 in every scanline and removes (skips) all of scanline 113, resulting in line portions 103 and 113 not appearing in FIG. 2. This shows that, with conventional nearest neighbor reduction scaling, some line removal will occur at different points on the page.

Specifically, the further the scale factor is from 1.0 increases the number of times this line removal will occur in conventional nearest neighbor scaling. For example, if the page is reduced by 1%, then 1% of the pixel locations (columns) and scanlines (rows) will be removed. In an 0.99 scaling example, at 1200 dpi an 11 inch page will have 132 columns and rows removed, which provides significant opportunity for certain text or lines to be negatively affected. Notice how in FIG. 2 the lines in the middle are removed, creating a blank area in the image, and this occurs because such lines fall on a column or scanline of the input image that was removed, while the other lines are unaffected.

To eliminate undesired results, such as the blank area 122 shown in FIG. 2, in image locations where columns or rows are to be removed rather than simply removing an entire row/column as is done in conventional nearest neighbor scaling, the systems and methods herein combine two immediately adjacent columns or two immediately adjacent rows and use alternating pixel data from each column in the combined column. Specifically, with systems and methods herein the data from a single recurring pixel or scanline position is taken alternately from a single recurring pixel or scanline position and from an immediately adjacent pixel or scanline position. In other words, the processing herein combines immediately adjacent columns (e.g., columns that differ by only one pixel location in the scanline).

Using the previous example of two adjacent scanlines that have the pixel values: a,b,c,d,e,f; systems and methods herein apply one interpolation to output: a,b,c,e,f., which removes pixel d as before; however, on the subsequent scanline, these systems and methods remove one pixel earlier to output: a,b,d,e,f, where the pixel c is removed. The very next scanline in order alternates back and again uses pixel values: a,b,c,e,f and the following scanline again alternates back and uses pixel values: a,b,d,e,f. The following scanlines similarly alternate the data from pixels d and c in the scanline position between b and e.

Therefore, instead of removing an entire column/row of pixels, as is done in conventional nearest neighbor scaling (e.g., the entire column of scanline pixel d), these systems and methods replace a pair of immediately adjacent columns (e.g., the columns of scanline pixel c and scanline pixel d) with a single new column that alternates data from the pair of adjacent columns that are removed. Thus, for example, with such pixel toggling processing, in the single new column along the recurring pixel scanline position the pixel value "c" can be used for odd scanlines, while the pixel value "d" is used for even scanlines. When using such pixel toggling processing for pictorials (where adjacent pixels are highly correlated) the high correlation of adjacent prevents such pixel toggling processing from being highly apparent.

Figure 3:
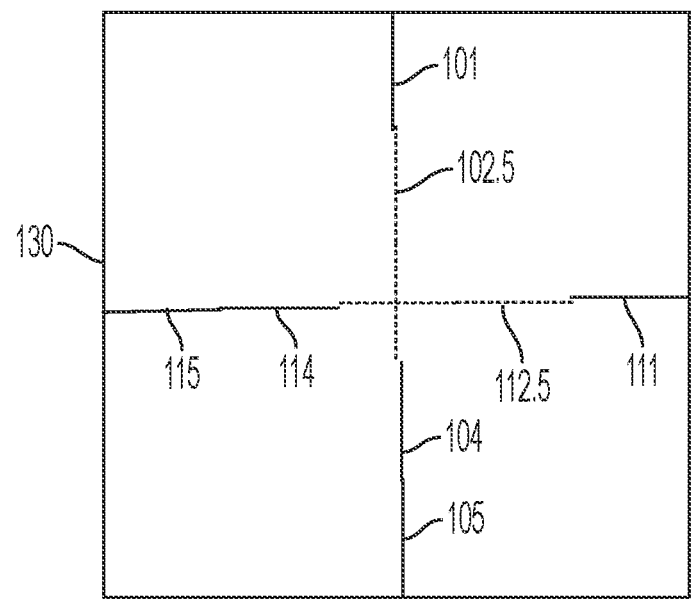
FIG. 3 is a schematic diagram illustrating processing performed on the image shown in FIG. 1 by methods and devices herein.

As can be seen in in FIG. 3 which shows the same image portion (now numbered 130), this pixel toggling image reduction scaling performed by systems and methods herein on the image in FIG. 1 results in the two solid lines 102, 103 being removed and replaced by a half-dotted line 102.5 and the two solid lines 112, 113 being removed and replaced by half-dotted line 112.5. The lines 102.5 and 112.5 are made up of alternating light and dark pixels because half of the pixels take data from the input "c" and half of the pixels take data from column "d."

This avoids the blank areas (122 in FIG. 2) that can occur with conventional nearest neighbor scaling and, even though the lines 102.5 and 112.5 are lighter than their source lines 102 and 112, the lines still appear visually. Indeed, the reduced darkness of the lines 102.5 and 112.5 is only seen at high magnifications, such as that shown in FIGS. 1-6.

In one exemplary implementation, the following scaling/translation equation can be used to perform pixel toggling processing by systems and methods herein: $xpos\_in = (1+\varepsilon_x) * xpos\_out + Tx + (rem(ypos\_out, 2) - 0.5) * \varepsilon x$. In the previous equation, xpos_in is the input position in the x direction, xpos_out is the output position in the x direction, c, is the scale difference from unity in the x direction, Tx is the x translation amount, the function rem(a,b) is the remainder of a divided by b, and ypos_out is the output position in the y direction.

With this equation, every other row is shifted (translated) by an amount equal to the half the scale difference from unity. This is comparable to an off-diagonal term in an affine matrix where the output x position would be affected by a coefficient times the y position. In this pixel toggling processing the output x position is shifted by the remainder of the ypos divided by 2. This causes the shift to oscillate between two values instead of linearly increasing with increasing y position.

Note that the ypos_out, which is the output pixel location is always an integer that increases for each row. Adjacent rows therefore have a shift difference of: $\varepsilon_x$— one row is shifted forward by $\varepsilon_x/2$ from nominal and the adjacent one is shifted back. This shift difference will shift by one pixel location which pixel is removed in a reduction case (or added in an enlargement case). Similarly, the equation for calculating the y value is amended to: $ypos\_in = (1+\varepsilon_y) * ypos\_out + Ty + (rem(xpos\_out, 2) - 0.5) * \varepsilon_y$.

Figure 4:
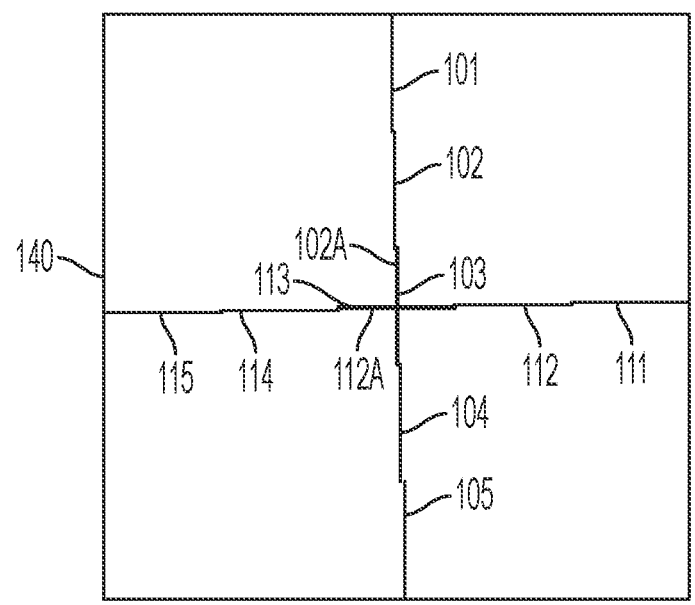
FIG. 4 is a schematic diagram illustrating processing performed on the image shown in FIG. 1.
Figure 5:
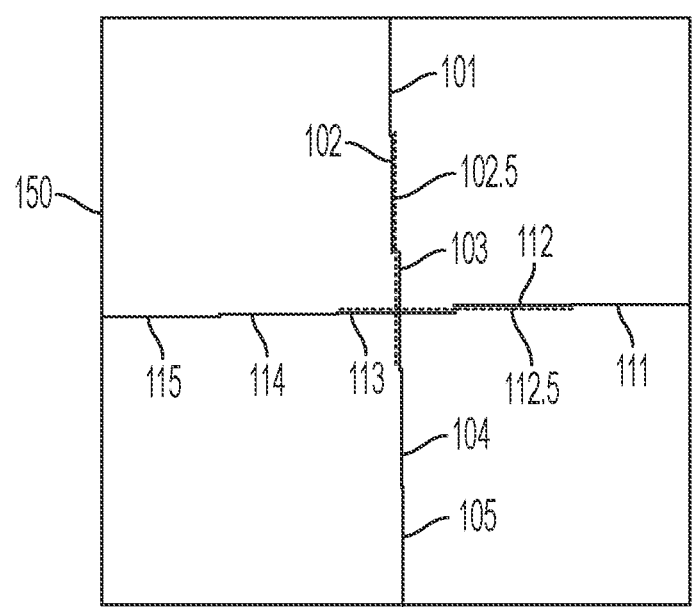
FIG. 5 is a schematic diagram illustrating processing performed on the image shown in FIG. 1 by methods and devices herein.

While the above discusses the situation where the scaling decreases the image size, this processing is also useful where the image size is increased. FIGS. 4 and 5 show enlargement scaling, where column(s)/row(s) are added to an image by repeating certain pixels instead of removing pixel. A conventional nearest neighbor enlargement scaling of the image shown in FIG. 1 is shown in FIG. 4 (now numbered 140). In FIG. 4, an added column 102A and an inserted row 112A doubles the vertical and horizontal lines in the center of FIG. 4. Line 102A is identical to line 102 and is simply a copy of that pixel data and, similarly, line 112A is identical to line 112 and is simply a copy of that pixel data. This increase in line thickness from doubling lines 102 and 112 may be apparent to users, decreasing image quality.

FIG. 5 which shows the same image portion (now numbered 150) where the systems and methods herein perform pixel toggling increase scaling to add row(s) and column(s). Specifically, the additional vertical and horizontal column (s)/row(s) in FIG. 5 (102.5, 112.5) utilize the above-described pixel toggling processing in which the additional vertical and horizontal column(s)/row(s) alternately take data from column(s)/row(s) that are immediately adjacent to the added column(s)/row(s), without lines 102, 103, 112, or 113 being removed. The relative lightness of the lines 102.5 and 112.5 in FIG. 5 compared to solid lines 102A and 112A in FIG. 4 decreases the line thickness increase and thereby reduces the affect such additional lines may have on image quality.

FIGS. 6A-6C show some examples of processing area 160 in FIG. 1. While FIG. 1 is a high magnification, FIGS. 6A-6C show an even greater magnification, down to a pixel-level view. Specifically, FIG. 6A shows that scanline positions 111, 114, and 115 are all non-printing or non-displaying pixels (shown as white in FIGS. 6A-6C). Scanline positions 112 and 113 have some printing/displaying pixels (shown as black in FIGS. 6A-6C).

FIG. 6B shows the pixel toggling processing in an image reduction scaling where scanlines 112 and 113 are removed and replaced by a new scanline 112.5. Note, FIG. 6B shows another scanline 110 adjacent scanline 111. Note that the added scanline 112.5 alternately has pixels from scanlines 112 and 113, which results in pixels along the scanline 112.5 that alternately print and do not print. FIG. 6C shows the pixel toggling processing in an image reduction scaling where the new scanline 112.5 is inserted between scanlines 112 and 113 (which remain in the image).

Figure 7:
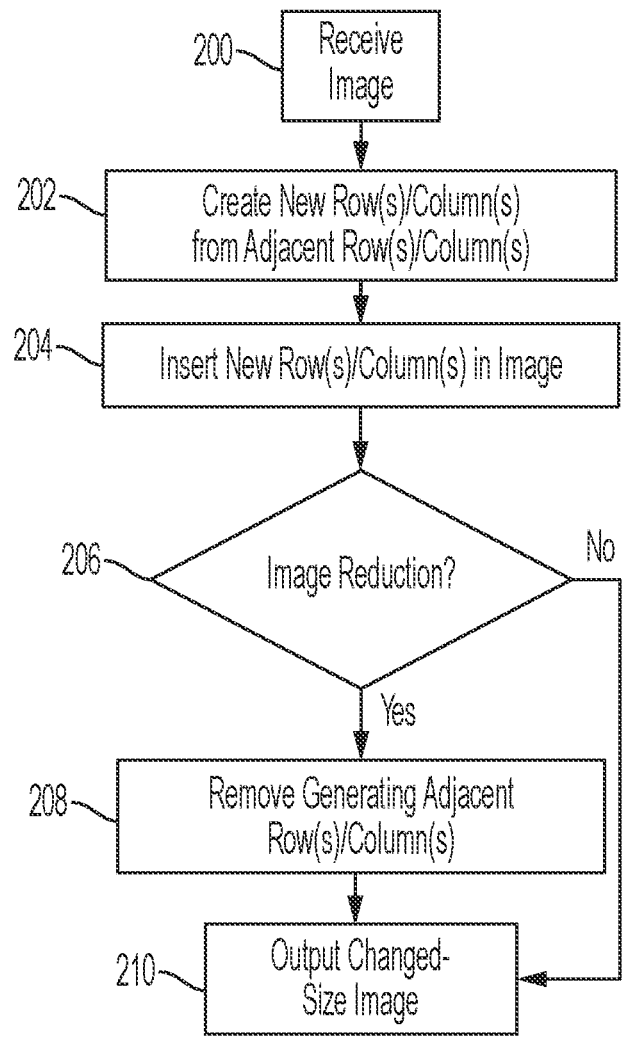
FIG. 7 is a flow diagram of various methods herein.

FIG. 7 is flowchart illustrating exemplary methods herein. In item 200, these methods receive an image that has pixels arranged in perpendicular rows/columns. For discussion purposes, the rows can be equated to scanlines and the columns can be equated to recurring pixel locations within scanlines, however any such correspondence is simply for convenience of discussion and is not limiting as to what can be considered a row or column.

The process of changing the size of the image includes removing, modifying, and/or inserting rows and/or columns. A new single row/column is generated by alternating the data values of adjacent rows/columns. Thus, the processing herein changes the size of the image by inserting at least one row/column in item 204. The inserted row(s)/column(s) are generated from data of adjacent rows/columns of the perpendicular rows/columns, as shown in item 202. Specifically, in item 202, the inserted row(s)/column(s) are formed from the alternating data from the generating adjacent rows/columns (e.g., alternating pixels from the generating adjacent rows/columns). Again, the generating adjacent rows/columns are immediately (directly) adjacent one another without intervening rows/columns being present.

In some embodiments that reduce the size of the image (as determined by decision box 206) these methods remove the generating adjacent rows/columns that were used to form the inserted row/column (item 208). In such reduction processing, the inserted row/column is added where the (now removed) generating adjacent rows/columns were previously positioned in item 204. In embodiments that increase the size of the image, instead of removing the generating adjacent rows/columns, the inserted row/column is merely inserted between the generating adjacent rows/columns and the removal step in item 208 is skipped (as shown by the arrow flowing directly from decision box 206 to item 210). Thus, these methods change the size of the image to produce a changed-size image and output the changed-size image in item 210 by changing file data, displaying the changed-size image, printing the changed-size image, etc.

Figure 8:
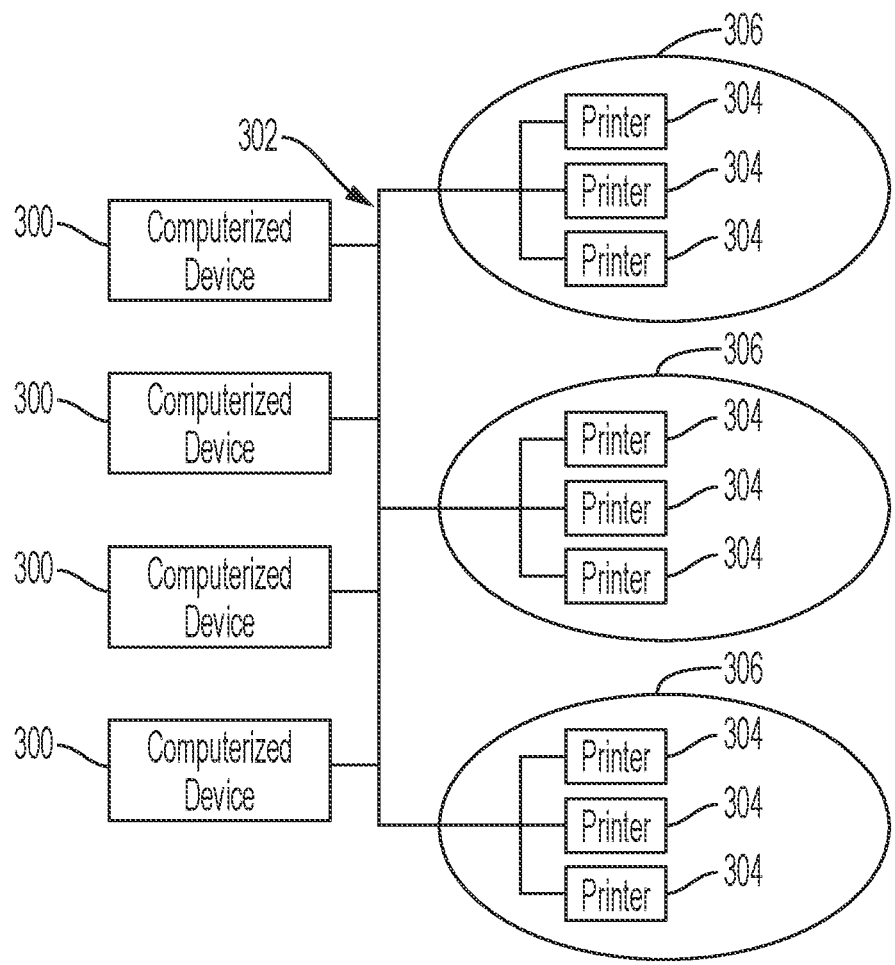
FIG. 8 is a schematic diagram illustrating systems herein.

As shown in FIG. 8, exemplary systems and methods herein include various computerized devices 300, 304 located at various different physical locations 306. The computerized devices 300, 304 can include print servers, printing devices, personal computers, etc., and are in communication (operatively connected to one another) by way of a local or wide area (wired or wireless) network 302.

Figure 9:
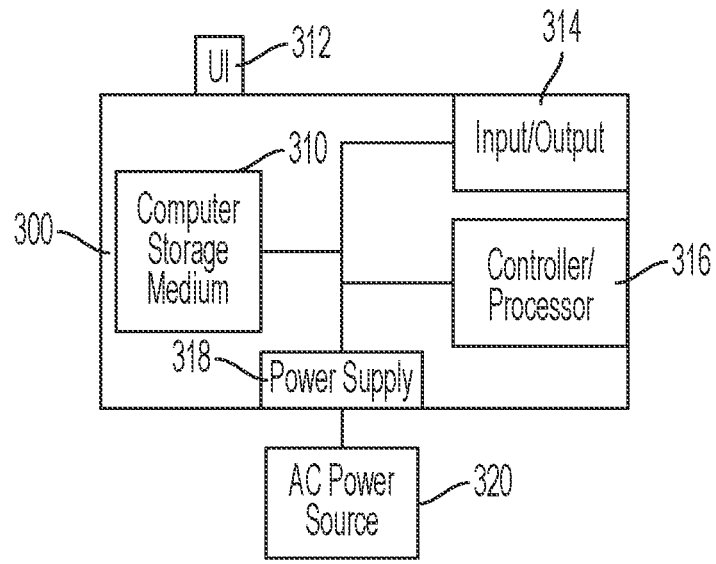
FIG. 9 is a schematic diagram illustrating devices herein.

FIG. 9 illustrates a computerized device 300, which can be used with systems and methods herein and can comprise, for example, a print server, a personal computer, a portable computing device, etc. The computerized device 300 includes a controller/tangible processor 316 and a communications port (input/output) 314 operatively connected to the tangible processor 316 and to the computerized network 302 external to the computerized device 300. Also, the computerized device 300 can include at least one accessory functional component, such as a user interface (UI) assembly 312. The user may receive messages, instructions, and menu options from, and enter instructions through, the user interface or control panel 312.

The input/output device 314 is used for communications to and from the computerized device 300 and comprises a wired device or wireless device (of any form, whether currently known or developed in the future). The tangible processor 316 controls the various actions of the computerized device. A non-transitory, tangible, computer storage medium device 310 (which can be optical, magnetic, capacitor based, etc., and is different from a transitory signal) is readable by the tangible processor 316 and stores instructions that the tangible processor 316 executes to allow the computerized device to perform its various functions, such as those described herein. Thus, as shown in FIG. 9, a body housing has one or more functional components that operate on power supplied from an alternating current (AC) source 320 by the power supply 318. The power supply 318 can comprise a common power conversion unit, power storage element (e.g., a battery, etc), etc.

Figure 10:
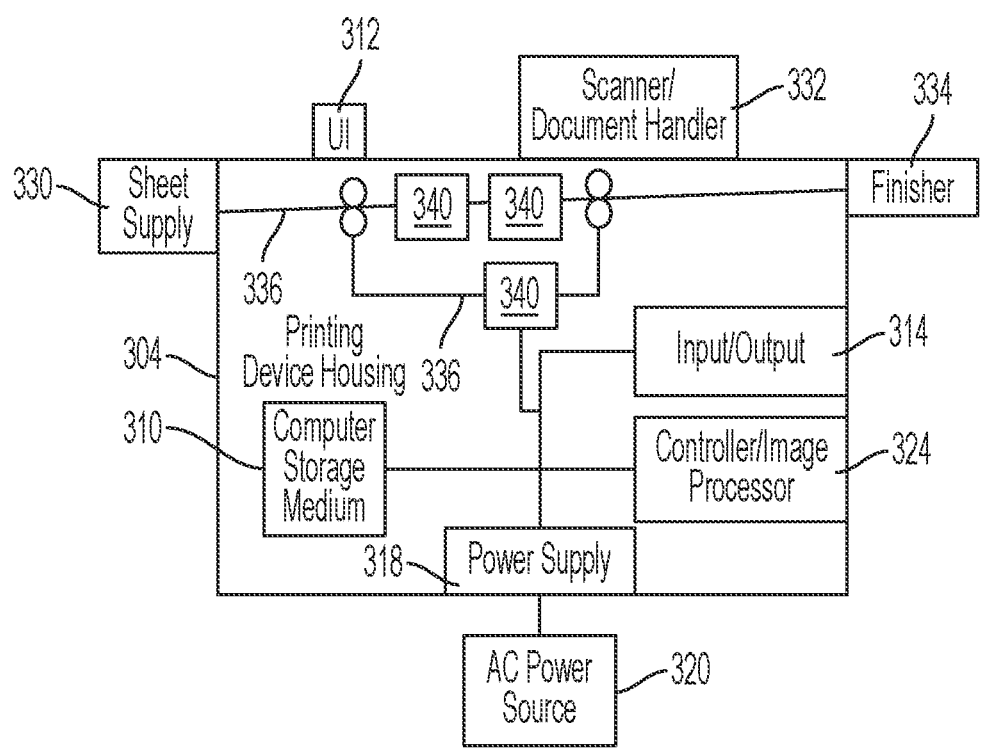
FIG. 10 is a schematic diagram illustrating devices herein.

FIG. 10 illustrates a computerized device that is a printing device 304, which can be used with systems and methods herein and can comprise, for example, a printer, copier, multi-function machine, multi-function device (MFD), etc. The printing device 304 includes many of the components mentioned above and at least one marking device (printing engine(s)) 340 operatively connected to a specialized image processor 324 (that is different from a general purpose computer because it is specialized for processing image data), a media path 336 positioned to supply continuous media or sheets of media from a sheet supply 330 to the marking device(s) 340, etc. After receiving various markings from the printing engine(s) 340, the sheets of media can optionally pass to a finisher 334 which can fold, staple, sort, etc., the various printed sheets. Also, the printing device 304 can include at least one accessory functional component (such as a scanner/document handler 332 (automatic document feeder (ADF)), etc.) that also operate on the power supplied from the external power source 320 (through the power supply 318).

System embodiments herein include (among other components) a processor 316, 324 adapted to receive an image. The image has pixels arranged in perpendicular rows/columns. Such systems also include an input/output device 314 adapted to receive instructions to change the size of the image. The processor 316, 324 is adapted to change the size of the image to produce a changed-size image. The input/output is adapted to output the changed-size image. The processor 316, 324 is adapted to change the size of the image by adding at least one row/column as at least one inserted row/column. This inserted row/column is formed from data from generating adjacent rows/columns of the perpendicular rows/columns.

When the instructions to change the size of the image include instruction to reduce the size of the image, the processor 316, 324 is adapted to remove the generating adjacent rows/columns and the inserted row/column is added where the generating adjacent rows/columns were positioned. When the instructions to change the size of the image are instruction to increase the size of the image, the inserted row/column is inserted between the generating adjacent rows/columns. The inserted row/column is made up of alternating data (e.g., pixels) from the generating adjacent rows/columns.

Figure 11:
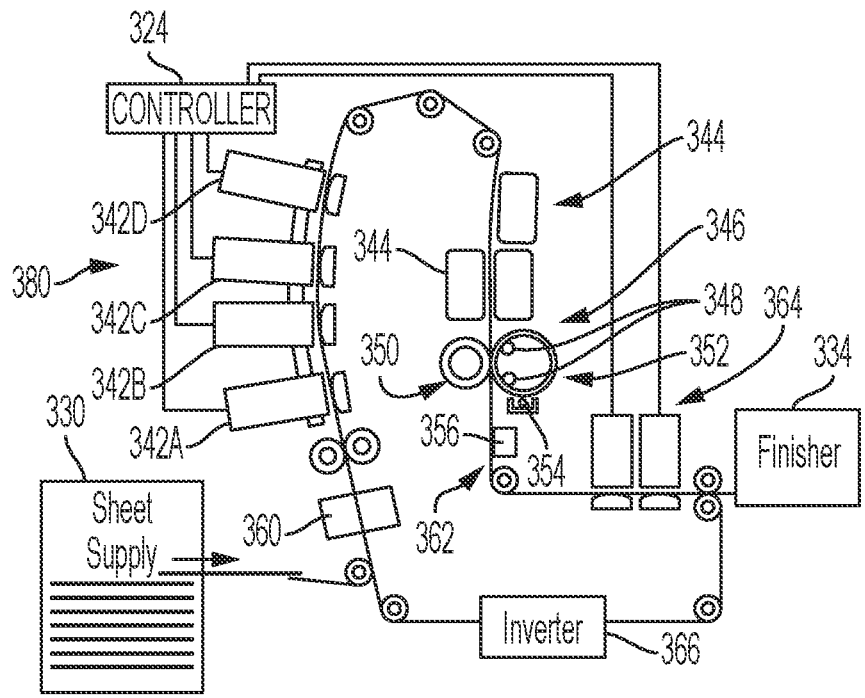
FIG. 11 is a schematic diagram illustrating devices herein.
Figure 12:
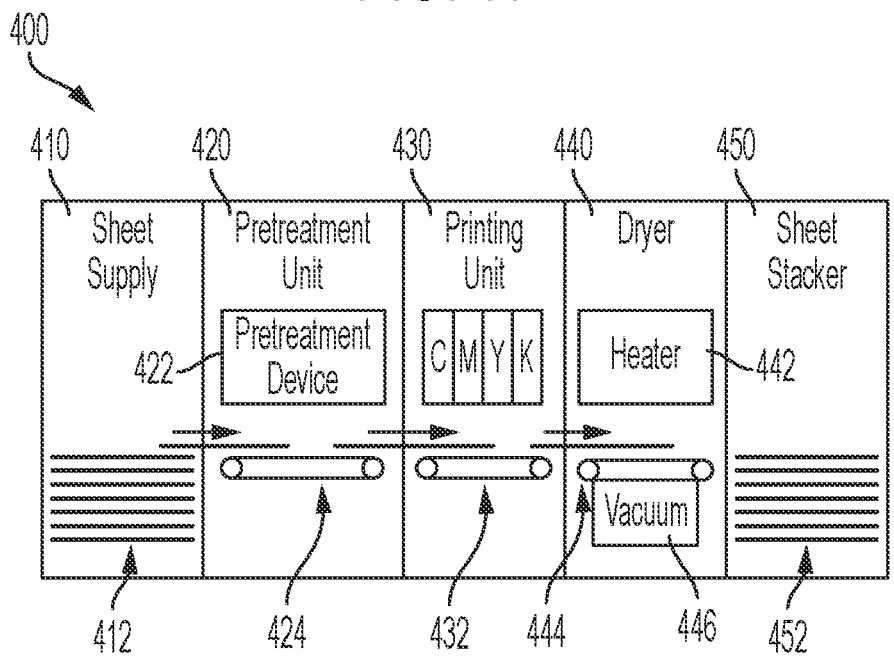
FIG. 12 is a schematic diagram illustrating devices herein.

The one or more printing engines 340 are intended to illustrate any marking device that applies a marking material (toner, inks, etc.) to continuous media or sheets of media, whether currently known or developed in the future and can include, for example, devices that use an ink jet imaging system, as shown in FIG. 11, or a high-speed aqueous imaging system, as shown in FIG. 12.

More specifically, FIG. 11 illustrates one example of the above-mentioned printing engine(s) 380 that is an ink jet imaging system. In this example, the imaging apparatus 380 is in the form of an ink jet printer that employs one or more ink jet printheads, each with an associated solid ink supply (342A-342D). The exemplary direct-to-sheet phase-change ink jet imaging system 380 includes a media supply and handling system 330 configured to supply media (e.g., paper, plastic, or other printable material), a media conditioner 360, printed sheet conditioner 344, coating station 364, and finisher 334.

The media is propelled by a sheet transport 362 that can include a variety of motors rotating one or more rollers. For duplex operations, an inverter 366 may be used to flip the sheet over to present a second side of the media to the printheads 342A-342D.

The media conditioner 360 includes, for example, a pre-heater. The pre-heater brings the media to an initial predetermined temperature that is selected for desired image characteristics corresponding to the type of media being printed as well as the type, colors, and number of inks being used. The pre-heater may use contact, radiant, conductive, or convective heat to bring the media to a target preheat temperature.

The media is transported through a printing station that includes a series of color printheads 342A-342D, each color unit effectively extending across the width of the media and being able to place ink directly (i.e., without use of an intermediate or offset member) onto the moving media. As is generally familiar, each of the printheads may eject a single color of ink, one for each of the colors typically used in color printing, namely, cyan, magenta, yellow, and black (CMYK). A controller 324 generates timing signals for actuating the ink jet ejectors in the printheads 342A-342D in synchronization with the passage of the media to enable the four colors to be ejected with a reliable degree of accuracy for registration of the differently colored patterns to form four primary-color images on the media. The ink jet ejectors are actuated by the firing signals to correspond to image data processed by the controller 324 that may be transmitted to the printer, generated by a scanner (not shown) that is a component of the printer, or otherwise generated and delivered to the printer. In various possible embodiments, a color unit for each primary color may include one or more printheads; multiple printheads in a color unit may be formed into a single row or multiple row array; printheads of a multiple row array may be staggered; a printhead may print more than one color; or the printheads or portions of a color unit may be mounted movably in a direction transverse to the process direction, such as for spot-color applications and the like.

Each of color printheads 342A-342D may include at least one actuator configured to adjust the printheads in each of the printhead modules in the cross-process direction across the media web. In a typical embodiment, each motor is an electromechanical device such as a stepper motor or the like. In a practical embodiment, a print bar actuator is connected to a print bar containing two or more printheads and is configured to reposition the print bar by sliding the print bar along the cross-process axis of the media web. In alternative embodiments, an actuator system may be used that does not physically move the printheads, but redirects the image data to different ejectors in each head to change head position.

The printer may use liquid ink or "phase-change ink," by which is meant that the ink is substantially solid at room temperature and substantially liquid when heated to a phase change ink melting temperature for jetting onto the imaging receiving surface. The phase change ink melting temperature may be any temperature that is capable of melting solid phase change ink into liquid or molten form. As used herein, liquid ink refers to melted solid ink, heated gel ink, or other known forms of ink, such as aqueous inks, ink emulsions, ink suspensions, ink solutions, or the like.

Associated with each color unit is a backing member, typically in the form of a bar or roll, which is arranged substantially opposite the color unit on the back side of the media. Each backing member is used to position the media at a predetermined distance from the printheads opposite the backing member. Each backing member may be configured to emit thermal energy to heat the media to a predetermined temperature.

Following the printing zone along the media path are one or more "mid-heaters" 344. A mid-heater 344 may use contact, radiant, conductive, and/or convective heat to control a temperature of the media and particularly to bring the media to a temperature suitable for desired properties when passing through the spreader 346. A fixing assembly in the form of the "spreader" 346 is configured to apply heat and/or pressure to the media to fix the images to the media. The function of the spreader 346 is to take what are essentially droplets, strings of droplets, or lines of ink on the sheet and smear them out by pressure and, in some systems, heat, so that spaces between adjacent drops are filled and image solids become uniform. The spreader 346 may include rollers, such as image-side roller 352 and pressure roller 350, to apply heat and pressure to the media, either of which can include heating elements, such as heating elements 348, to bring the media to a predetermined temperature. The spreader 346 may also include a cleaning/oiling station 354 associated with image-side roller 352. The station 354 cleans and/or applies a layer of some release agent or other material to the roller surface. A coating station 364 applies a clear ink to the printed media to modify the gloss and/or to help protect the printed media from smearing or other environmental degradation following removal from the printer.

Operation and control of the various subsystems, components and functions of the imaging system are performed with the aid of the controller 324. The controller 324 may be implemented with general or specialized programmable processors that execute programmed instructions. The controller 324 may be operatively coupled to the print bar and printhead actuators of color printheads 342A-342D in order to adjust the position of the print bars and printheads along the cross-process axis of the media web. In particular, the controller may be operable to shift one or more, or all, of the color units laterally or transverse to the process direction.

The imaging system may also include an optical imaging system 356 that is configured in a manner similar to that for creating the image to be transferred to the web. The optical imaging system is configured to detect, for example, the presence, intensity, and/or location of ink drops jetted onto the receiving member by the ink jets of the printhead assembly. The imaging system may incorporate a variety of light sources capable of illuminating the printed web sufficient to detect printing errors that may be attributable to a faulty or defective ink jet or printhead. The imaging system 356 further includes an array of light detectors or optical sensors that sense the image reflected from the printed web prior to discharge. The controller 324 analyzes the information from the imaging system 356 to determine, among other things, whether a failure or an ink jet or printhead has occurred. The location of the defective printing element is identified and made available to the maintenance technician during a diagnosis procedure. The controller 324 may also use the data obtained from the imaging system 356 to adjust the registration of the color units such as by moving a color unit or one or more printheads. This image data may also be used for color control.

FIG. 12 illustrates an inkjet or aqueous ink printer system 400 that is one of the printers 304, discussed above. Specifically, FIG. 12 illustrates a high-speed ink jet or aqueous ink image producing machine or printer 400. The printer 400 includes a media supply 410, a pretreatment unit 420, a printing unit 430, a dryer 440, and a sheet stacker 450. The media supply 410 stores a plurality of media sheets 412 for printing by the printer 400.

The pretreatment unit 420 includes at least one pretreatment device 422 and transport belt 424. The pretreatment unit 420 receives the media sheets from the media supply 410 and transports the media sheets in a process direction (block arrows in FIG. 12) through the pretreatment unit 420. The pretreatment device 422 conditions the media sheets and prepares the media sheets for printing in the printing unit 430. The pretreatment unit 420 may include, for example, a coating device that applies a coating to the media sheets, a drying device that dries the media sheets, and/or a heating device that heats the media sheets to a predetermined temperature. In some embodiments, the printer 400 does not include a pretreatment unit 420 and media sheets are fed directly from the media supply 410 to the printing unit 430. In other embodiments, the printer 400 may include more than one pretreatment unit.

The printing unit 430 includes at least one marking unit transport belt 432 that receives the media sheets from the pretreatment unit 420 or the media supply 410 and transports the media sheets through the printing unit 430. The printing unit 430 further includes at least one printhead (labeled CMYK in FIG. 12 to represent the standard cyan, magenta, yellow, and black color printheads; however any color printheads could be used). The printhead (CMYK) ejects aqueous ink onto the media sheets as the media sheets are transported through the printing unit 430. In the illustrated embodiment, the printing unit 430 includes four printheads (CMYK), each of which ejects one of cyan, magenta, yellow, and black ink onto the media sheets. The reader should appreciate, however, that other embodiments include other printhead arrangements, which may include more or fewer printheads, arrays of printheads, etc.

The dryer 440 includes a heater 442 and a vacuum drying belt 444 that receives the media sheets from the printing unit 430. A vacuum plenum 446 connects to a vacuum blower or the plumbing that is connected to a vacuum blower at one side in the cross-process direction. The sheet stacker 450 receives and stacks the printed sheets 452.

While FIGS. 10 and 11 illustrate four marking stations adjacent or in contact with a rotating belt, which is useful with systems that mark in four different colors such as, red, green, blue (RGB), and black; or cyan, magenta, yellow, and black (CMYK), as would be understood by those ordinarily skilled in the art, such devices could use a single marking station (e.g., black) or could use any number of marking stations (e.g., 2, 3, 5, 8, 11, etc.).

The print media is then transported by the sheet output transport 336 to output trays or a multi-function finishing station 334 performing different desired actions, such as stapling, hole-punching and C or Z-folding, a modular booklet maker, etc., although those ordinarily skilled in the art would understand that the finisher/output tray 334 could comprise any functional unit.

As would be understood by those ordinarily skilled in the art, the printing devices shown here are only examples and the systems and methods herein are equally applicable to other types of printing devices that may include fewer components or more components. For example, while a limited number of printing engines and paper paths are illustrated, those ordinarily skilled in the art would understand that many more paper paths and additional printing engines could be included within any printing device used with systems and methods herein.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock TX, USA and Apple Computer Co., Cupertino CA, USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, CT, USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

In addition, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving an image into a processor, wherein the image comprises pixels arranged in perpendicular rows/columns;
   changing, by the processor, a size of the image to produce a changed-size image; and
   outputting, from the processor, the changed-size image,
   wherein the changing the size of the image comprises inserting at least one row/column as at least one inserted row/column,
   wherein the at least one inserted row/column comprises data from adjacent rows/columns of the perpendicular rows/columns, and
   wherein the at least one inserted row/column comprises alternating pixels data from the adjacent rows/columns.

2. The method according to claim 1, wherein the changing the size comprises reducing the size of the image, and wherein the method further comprises removing the adjacent rows/columns.

3. The method according to claim 2, wherein the at least one inserted row/column is added where the adjacent rows/columns were positioned.

4. The method according to claim 1, wherein the changing the size comprises increasing the size of the image, and wherein the at least one inserted row/column is inserted between the adjacent rows/columns.

5. The method according to claim 1, wherein the adjacent rows/columns are immediately adjacent one another without intervening rows/columns.

6. A method comprising:
   receiving an image into a processor, wherein the image comprises pixels arranged in scanlines;
   changing, by the processor, a size of the image to produce a changed-size image; and
   outputting, from the processor, the changed-size image,
   wherein the changing the size of the image comprises adding at least one of:
      adding a pixel to each of the scanlines as added pixels; and
      adding a scanline as an added scanline,
   wherein the added pixels comprise data from adjacent pixels, and
   wherein the added scanline comprises data from adjacent scanlines,
   wherein the added pixels comprise alternating pixels data from the adjacent scanlines, and
   wherein the added scanline comprise alternating pixels data from the adjacent scanlines.

7. The method according to claim 6, wherein the changing the size comprises reducing the size of the image, and
wherein the method further comprises removing the adjacent pixels and adjacent scanlines.

8. The method according to claim 7, wherein the added pixels are added where the adjacent pixels were positioned, and
wherein the added scanline is added where the adjacent scanlines were positioned.

9. The method according to claim 6, wherein the changing the size comprises increasing the size of the image,
wherein the added pixels are inserted between the adjacent pixels, and
wherein the added scanline is inserted between the adjacent scanlines.

10. The method according to claim 6, wherein the adjacent pixels are immediately adjacent one another without intervening pixels, and
wherein the adjacent scanlines are immediately adjacent one another without intervening scanlines.

11. A system comprising:
a processor adapted to receive an image, wherein the image comprises pixels arranged in perpendicular rows/columns; and
an input/output device adapted to receive instructions to change a size of the image,
wherein the processor is adapted to change the size of the image to produce a changed-size image,
wherein the input/output is adapted to output the changed-size image,
wherein the processor is adapted to change the size of the image by adding at least one row/column as at least one inserted row/column,
wherein the at least one inserted row/column comprises data from adjacent rows/columns of the perpendicular rows/columns, and
wherein the at least one inserted row/column comprises alternating pixels data from the adjacent rows/columns.

12. The system according to claim 11, wherein the instructions to change a size of the image comprise instruction to reduce the size of the image, and
wherein the processor is adapted to remove the adjacent rows/columns.

13. The system according to claim 12, wherein the at least one inserted row/column is added where the adjacent rows/columns were positioned.

14. The system according to claim 11, wherein the instructions to change a size of the image comprise instruction to increase the size of the image, and
wherein the at least one inserted row/column is inserted between the adjacent rows/columns.

* * * * *